US012610072B2

(12) United States Patent
Wang et al.

(10) Patent No.: US 12,610,072 B2
(45) Date of Patent: Apr. 21, 2026

(54) CHUNKED TRANSCODING AND UPLOADING FOR VIDEO TRANSMISSION

(71) Applicant: Snap Inc., Santa Monica, CA (US)

(72) Inventors: Yichen Wang, Shenzhen (CN);
Yuechuan Li, Rancho Palos Verdes, CA
(US); Si Wang, Santa Monica, CA
(US); Yihuan Zhou, Los Angeles, CA
(US); Haoyun Wu, Rancho Palos
Verdes, CA (US); Junhong Nie,
Redondo Beach, CA (US)

(73) Assignee: Snap Inc., Santa Monica, CA (US)

( * ) Notice: Subject to any disclaimer, the term of this
patent is extended or adjusted under 35
U.S.C. 154(b) by 147 days.

(21) Appl. No.: 18/469,256

(22) Filed: Sep. 18, 2023

(65) Prior Publication Data

US 2025/0097441 A1     Mar. 20, 2025

(51) Int. Cl.
| | |
|---|---|
| *H04N 19/436* | (2014.01) |
| *G06F 21/60* | (2013.01) |
| *H04N 19/136* | (2014.01) |
| *H04N 19/162* | (2014.01) |
| *H04N 19/40* | (2014.01) |
| *H04N 19/85* | (2014.01) |

(52) U.S. Cl.
CPC ......... *H04N 19/436* (2014.11); *G06F 21/602*
(2013.01); *H04N 19/136* (2014.11); ***H04N
19/162* (2014.11); *H04N 19/40*** (2014.11);
*H04N 19/85* (2014.11)

(58) Field of Classification Search
CPC .. H04N 19/436; H04N 19/136; H04N 19/162;
H04N 19/40; H04N 19/85; G06F 21/602
See application file for complete search history.

(56) References Cited

U.S. PATENT DOCUMENTS

| | | | |
|---|---|---|---|
| 2013/0232339 A1* | 9/2013 | Ignatchenko | ...... H04N 21/2347 |
| | | | 713/171 |
| 2015/0172161 A1* | 6/2015 | Isaksson | ............ H04N 21/6377 |
| | | | 725/95 |
| 2017/0093939 A1 | 3/2017 | Bar-mashiah et al. | |
| 2018/0213243 A1 | 7/2018 | Liu et al. | |
| 2019/0208241 A1* | 7/2019 | Kandov | ......... H04N 21/234309 |
| 2019/0253742 A1* | 8/2019 | Garten | ................. H04N 21/251 |
| 2024/0404278 A1 | 12/2024 | Heimann et al. | |
| 2025/0080690 A1 | 3/2025 | Pang et al. | |

FOREIGN PATENT DOCUMENTS

| | | | | |
|---|---|---|---|---|
| CN | 110121080 A | * | 8/2019 | ....... H04N 21/23418 |

OTHER PUBLICATIONS

Trattnig, Armin, "The Definitive Guide to Container File Formats",
[Online]. Retrieved from the Internet https bitmovin.com blog
container-formats-fun-1 , Jun. 2022, 17 pgs.

* cited by examiner

*Primary Examiner* — Maria E Vazquez Colon
(74) *Attorney, Agent, or Firm* — Schwegman Lundberg &
Woessner, P.A.

(57) ABSTRACT

Uploading of a video file is performed by transcoding,
processing and uploading portions of the video file in
parallel, to reduce total processing and upload time. The
processing of the video file may include applying associated
augmented reality effects to a raw video recording, to
generate an enhanced video recording for transmission and
viewing at a recipient device. The uploaded portions of the
video file may be assembled into a fragmented file format
such as fMP4, in which portions of the video file are stored
as fragments.

20 Claims, 13 Drawing Sheets

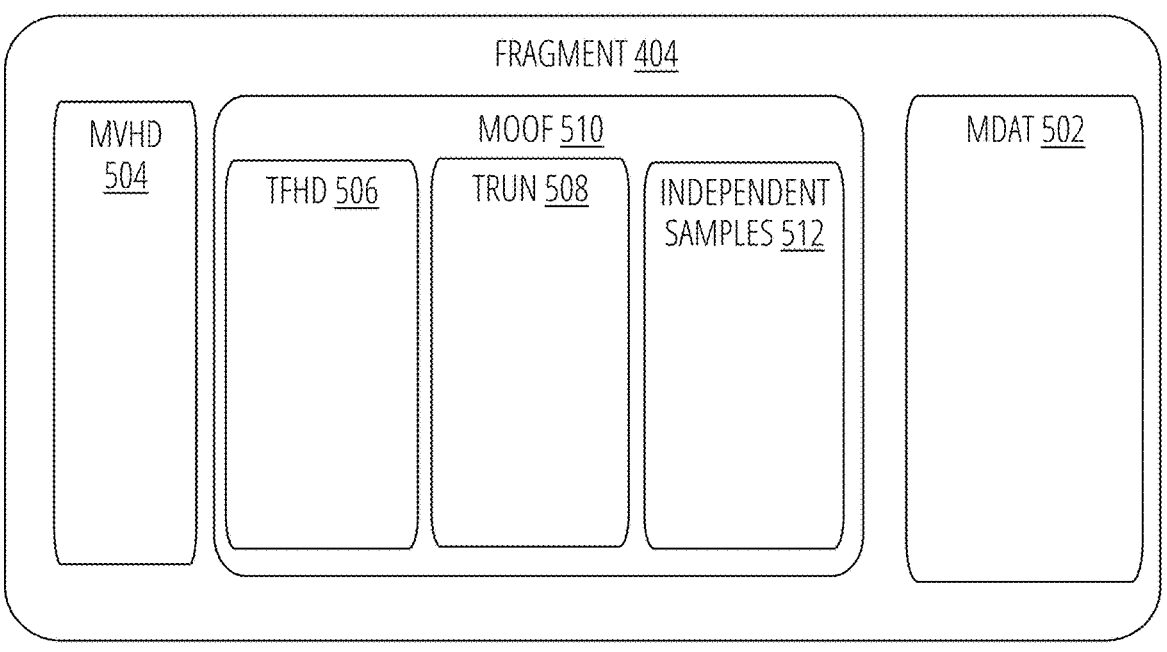
FIG. 5
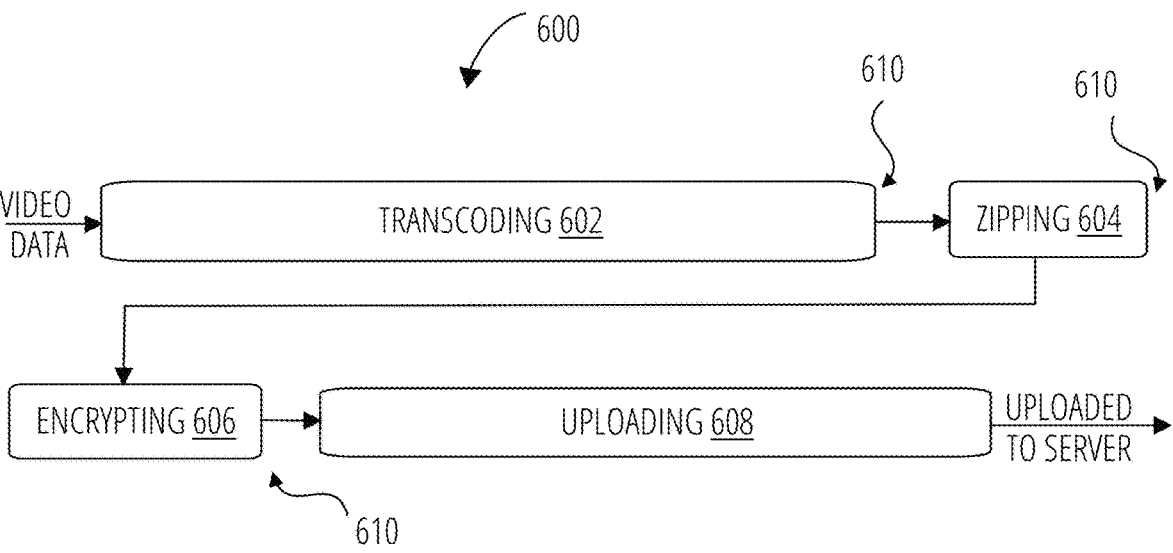
FIG. 6    (PRIOR ART)

CHUNKED TRANSCODING AND UPLOADING FOR VIDEO TRANSMISSION

TECHNICAL FIELD

The present disclosure relates to video transmission, including but not limited to streaming or uploading of video files.

BACKGROUND

Video transmission includes multiple steps in the transmission process, including transcoding, zipping, encrypting and uploading. This can introduce significant latency for long video files, with an associated decline in user satisfaction. It would be desirable to provide one or more alternative methods of transmitting video that alleviate this problem.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 5 illustrates the format of a fragment of the fragmented MP4 file of FIG. 4, according to some examples.

FIG. 6 illustrates a known method of uploading a video, according to some examples.

DETAILED DESCRIPTION

When a video is transmitted, for example to recipients in a chat session or to be posted in a feed on an interaction system, it may need to go through multiple client-side processes before it is finally uploaded to the server of the interaction system. A typical flow consists of several steps including transcoding, zipping, encrypting, and uploading. In this process, each step is executed in serial, and thus the total sending latency is the sum of each step's latency.

This approach is acceptable for short videos because the total latency is relatively short and all of the process steps run in the background. However, it is not ideal for longer videos. For a 60 second video, in a bad case scenario, it may currently take over 100 seconds before the user finally receives confirmation that the video has been sent. This long latency leads to a bad user experience as there may be a spinner (an animated icon that provides feedback to a user while content is loading or a request is being processed) displayed on the device user interface to indicate that the task is currently pending. The latency also means that it takes a long time for the recipient to receive and view the video, which introduces friction to the messaging cycle. The latency may also motivate the user to explore other features of the interaction system, or to send the interaction application to the background while sending, which further slows down the messaging cycle and engagement with the interaction application.

To address these problems, disclosed herein is a method of performing these steps in parallel in chunked processing approach, to reduce the overall system execution latency. Features of the approach in some examples include using fMP4 as the output file container format when transcoding, so that portions of the video (the chunks) can be outputted in streaming format before the entire video file is transcoded; using a modified encryption algorithm for encrypting streaming chunks; and merging the media chunks upon upload to produce a single encrypted video file. A cloud service such as Google Cloud may be used to merge the streaming encrypted chunks into a single encrypted file on the server side, using a resumable upload API and protocol.

A recipient device can either wait for all of the chunks to arrive and then process them in a batch (regular processing), or start processing immediately once the first chunk is received, if it can manage streaming input chunks (chunk processing). Using these approaches, it may also not be required to update the recipient's software for it to be backward compatible with the modified encryption methods.

Networked Computing Environment

Figure 1:
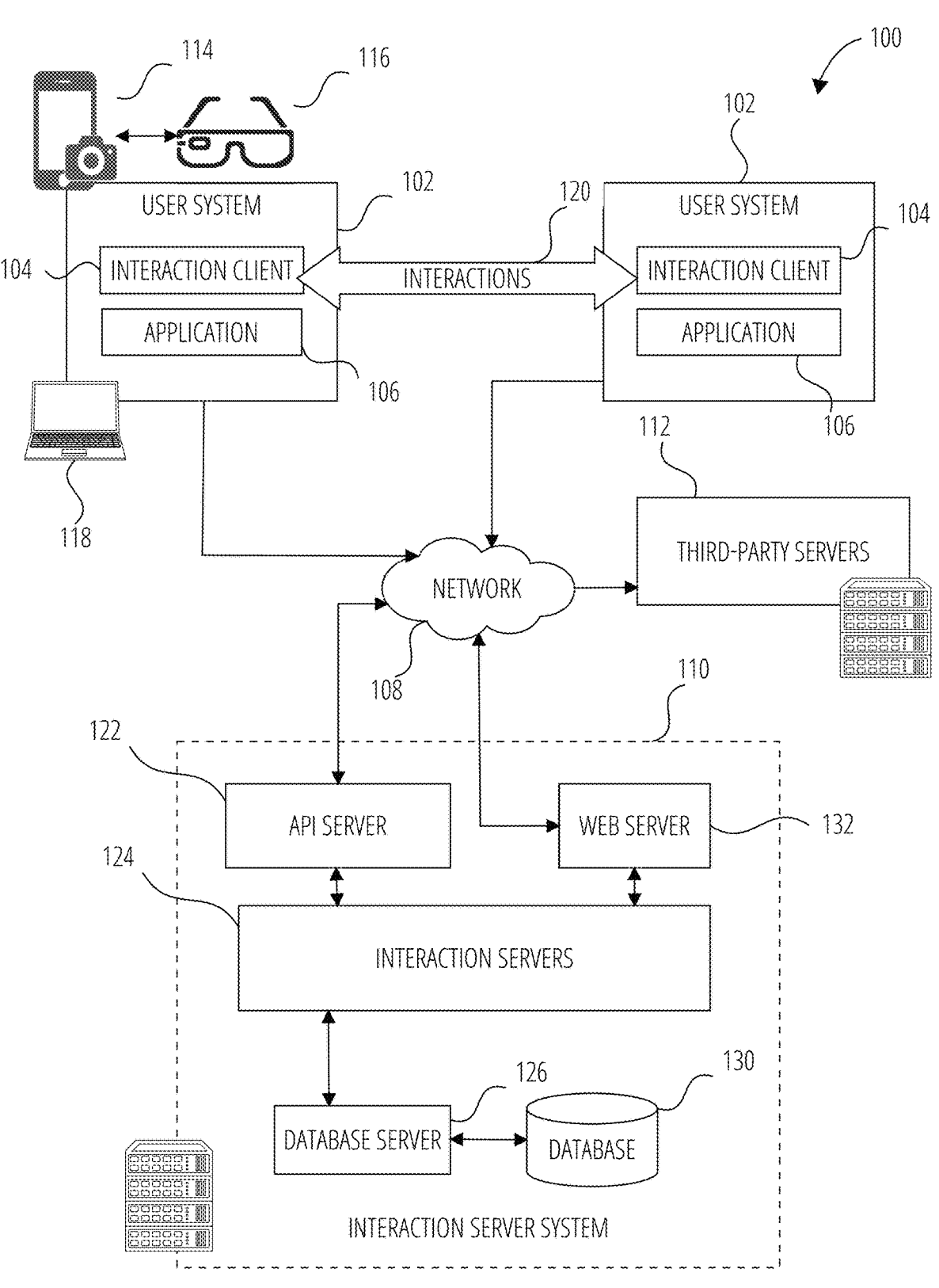
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 130 that stores data associated with interactions processed by the interaction servers 124. Similarly, a web server 132 is coupled to the interaction servers 124 and provides web-based interfaces to the interaction servers 124. To this end, the web server 132 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102;

the retrieval of messages and content; the addition and deletion of entities (e.g., friends) to an entity relationship graph; the location of friends within an entity relationship graph; and opening an application event (e.g., relating to the interaction client 104).

The interaction servers 124 host multiple systems and subsystems, described below with reference to FIG. 2.

System Architecture

Figure 2:
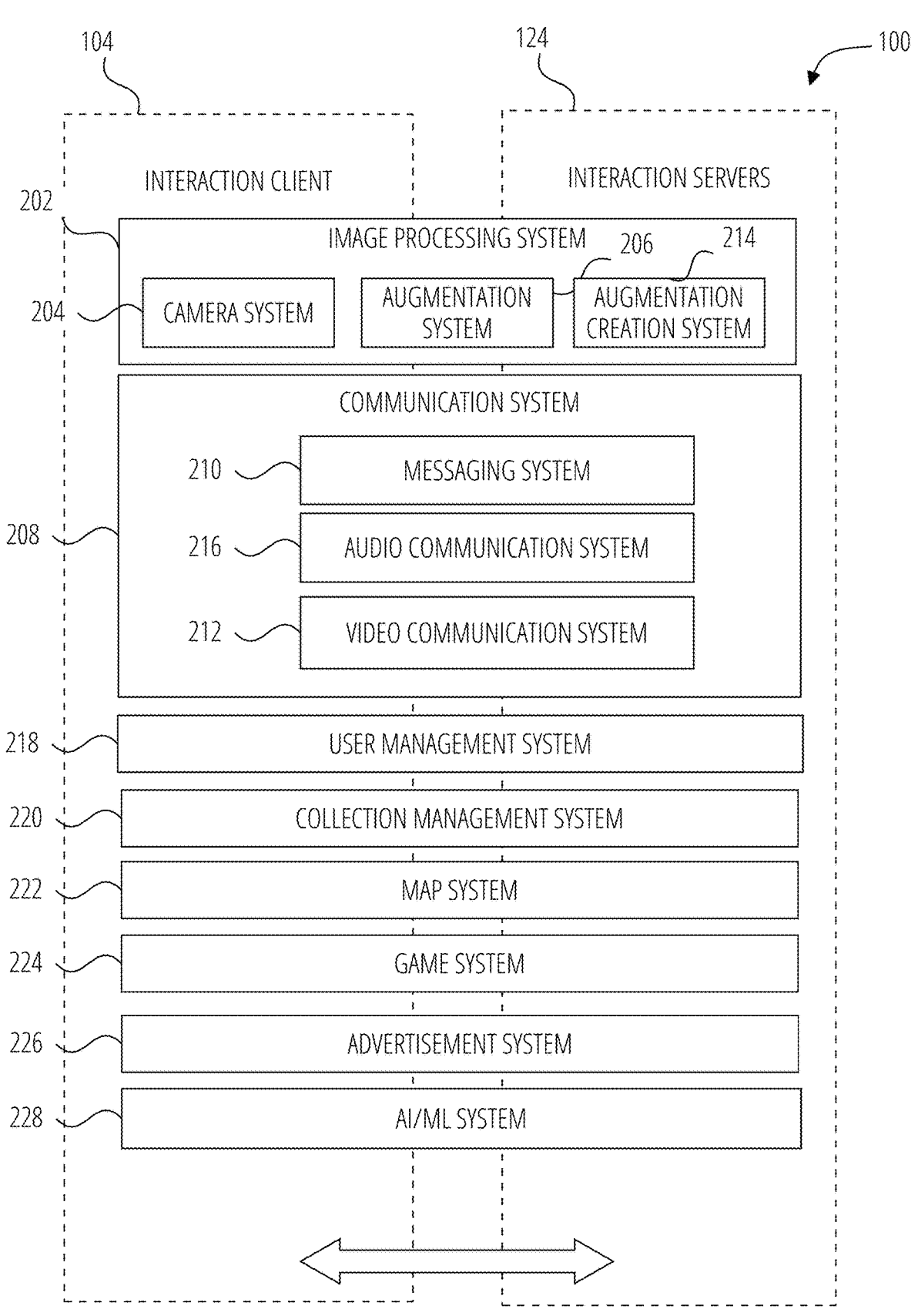
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 130). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1306 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 130 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in a user's profile data) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 226 operationally enables the purchasing of advertisements by third parties for presentation to end-users via the interaction clients 104 and also handles the delivery and presentation of these advertisements.

An artificial intelligence and machine learning system 228 provides a variety of services to different subsystems within the interaction system 100. For example, the artificial intelligence and machine learning system 228 operates with the image processing system 202 and the camera system 204 to analyze images and extract information such as objects, text, or faces. This information can then be used by the image processing system 202 to enhance, filter, or manipulate images. The artificial intelligence and machine learning system 228 may be used by the augmentation system 206 to generate augmented content and augmented reality experiences, such as adding virtual objects or animations to real-world images. The communication system 208 and messaging system 210 may use the artificial intelligence and machine learning system 228 to analyze communication patterns and provide insights into how users interact with each other and provide intelligent message classification and tagging, such as categorizing messages based on sentiment or topic. The artificial intelligence and machine learning system 228 may also provide chatbot functionality to message interactions 120 between user systems 102 and between a user system 102 and the interaction server system 110. The artificial intelligence and machine learning system 228 may also work with the audio communication system 216 to provide speech recognition and natural language processing capabilities, allowing users to interact with the interaction system 100 using voice commands.

Figure 3:
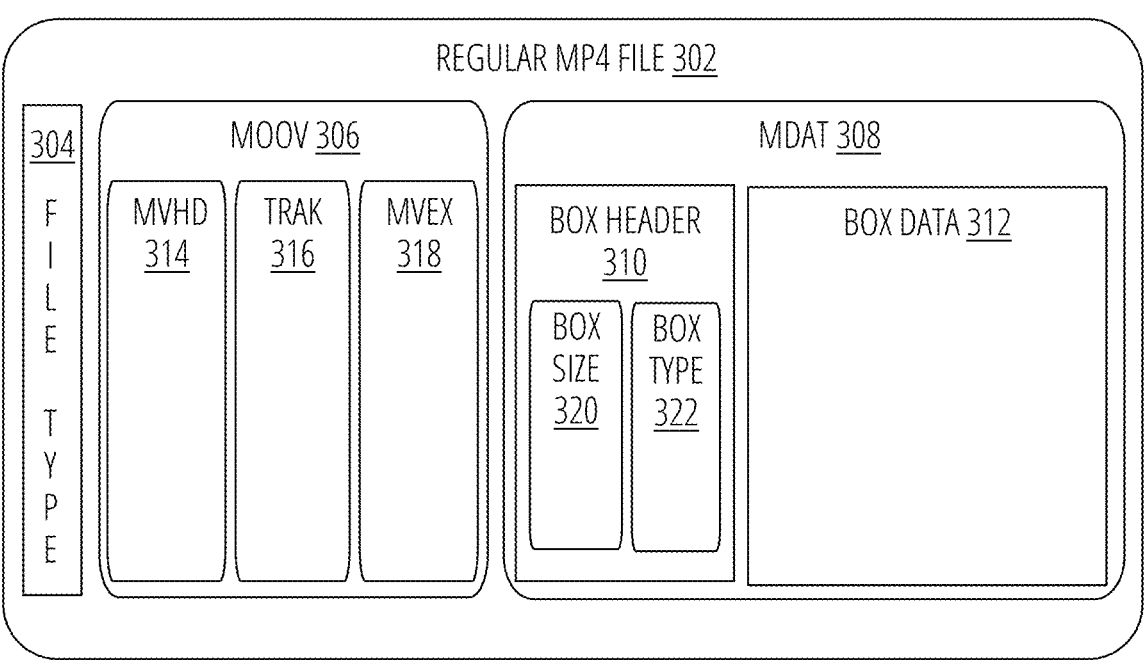
FIG. 3 illustrates the format of a regular MP4 file for transmitting a video, according to some examples.

FIG. 3 illustrates the format of a regular MP4 file 302 for transmitting a video, according to some examples. The regular MP4 file 302 includes three parts, a file type 304, movie metadata 306 and media data 308. The file type 304 is the general file description, the movie metadata 306 contains metadata about the video, and the media data 308 contains all of the video media data.

The movie metadata 306 comprises a movie header 314, track data 316 and movie extends data 318. The media data 308 comprises a box header 310 including a box size 320 and a box type 322, and a single media data box 312. Due to the limitations of the regular MP4 file 302, it is not suitable for use with the chunk transmission methods disclosed herein without substantial modification and associated compatibility concerns.

Figure 4:
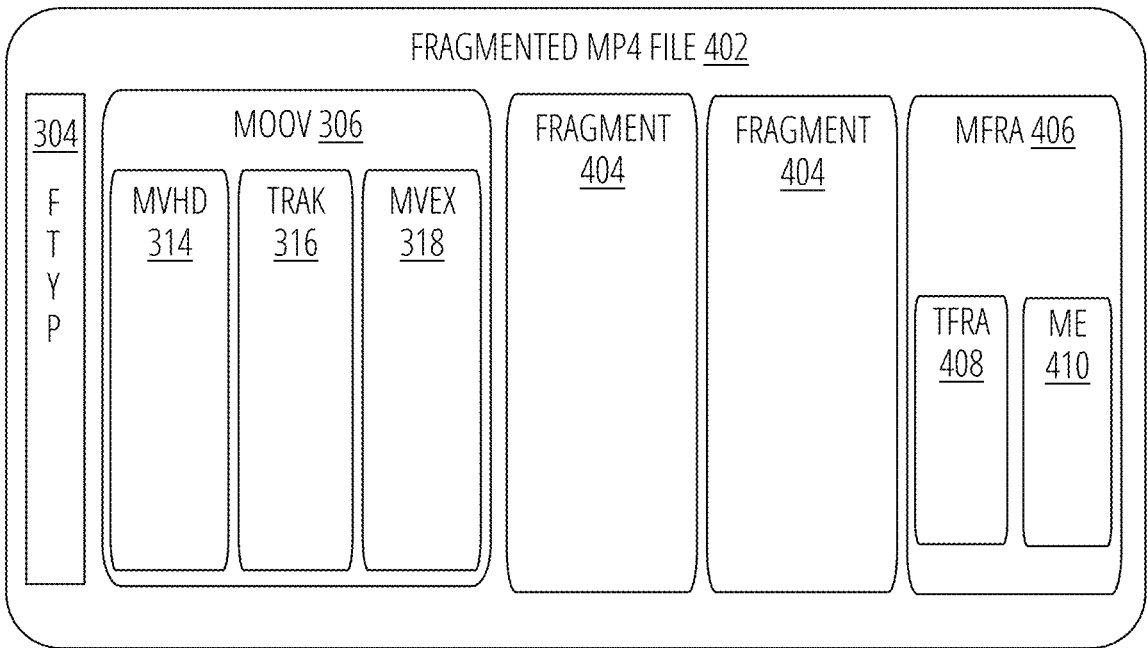
FIG. 4 illustrates the format of a fragmented MP4 file for transmitting a video using the methods disclosed herein, according to some examples.

FIG. 4 illustrates the format of a fragmented MP4 file 402 for transmitting a video using the methods disclosed herein, according to some examples. As before, the fragmented MP4 file 402 includes a file type 304 and movie metadata 306. The media data is however contained in a number of fragments 404, and a movie fragment random access data 406 is provided as an index to the fragments 404. As will be described in more detail below, individual chunks of a video to be uploaded can be processed in parallel for storage in a fragmented MP4 file 402. The movie fragment random access data 406 further comprises track fragment random access data 408 and movie fragment random access offset data 410.

FIG. 5 illustrates the format of the fragment 404 of the fragmented MP4 file 402 of FIG. 4, according to some examples. The fragment 404 comprises a movie fragment header 504, a movie fragment 510, and media data 502. The movie fragment 510 in turn comprises a track fragment header 506, a track fragment run 508 and independent samples 512.

FIG. 6 illustrates a known method 600 of uploading a video, according to some examples. As can be seen, the method proceeds serially, with the video data undergoing transcoding 602 followed by zipping 604, followed by encrypting 606 and finally uploading 608 to a server. Operations relating to file persistence 610 occur once for each of transcoding, zipping and encrypting operations. Each step has to complete for the entire video before the next step can commence, with resulting inefficiencies.

Figure 7:
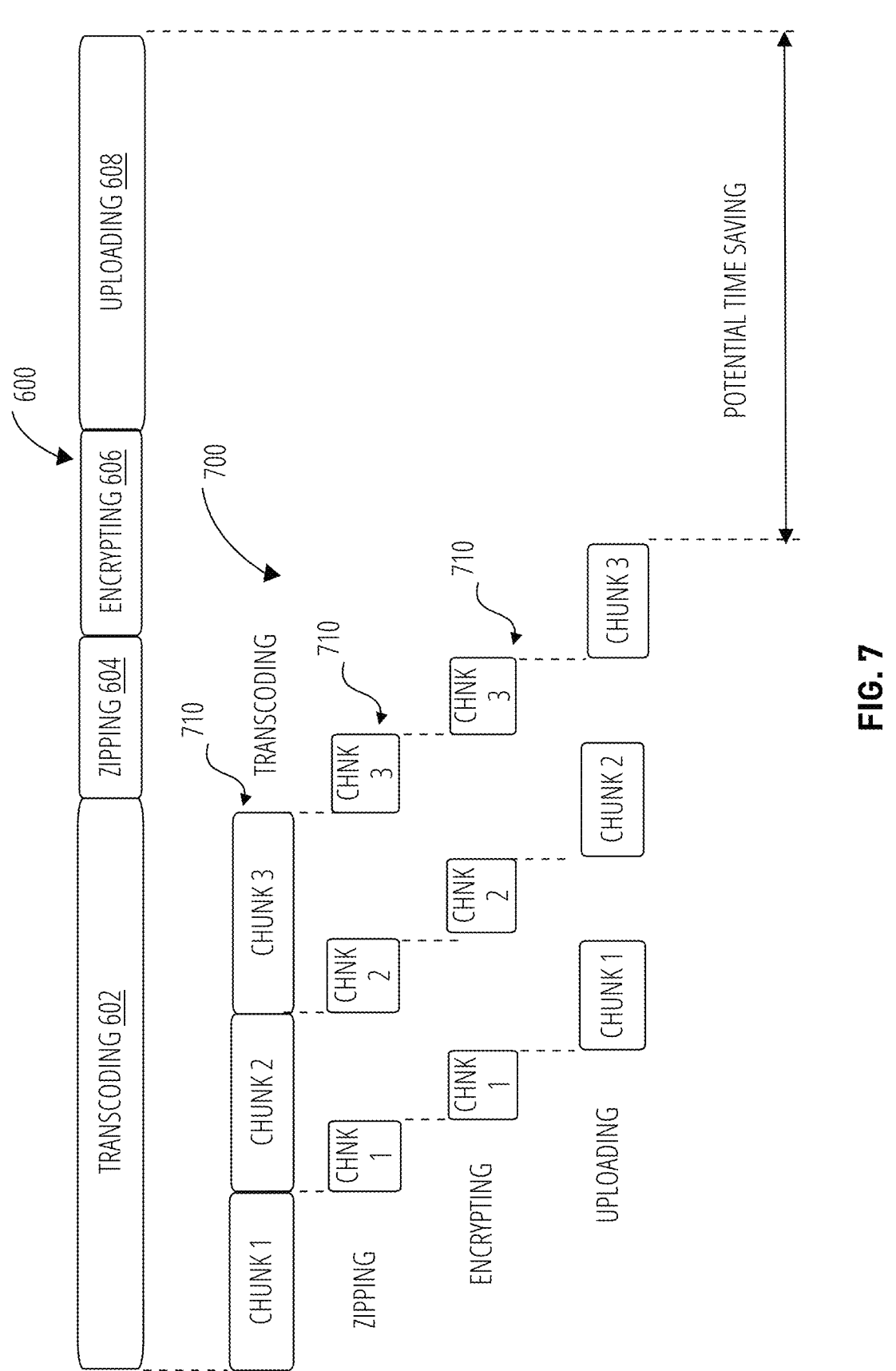
FIG. 7 illustrates a method of uploading a video, according to some examples.
Figure 13:
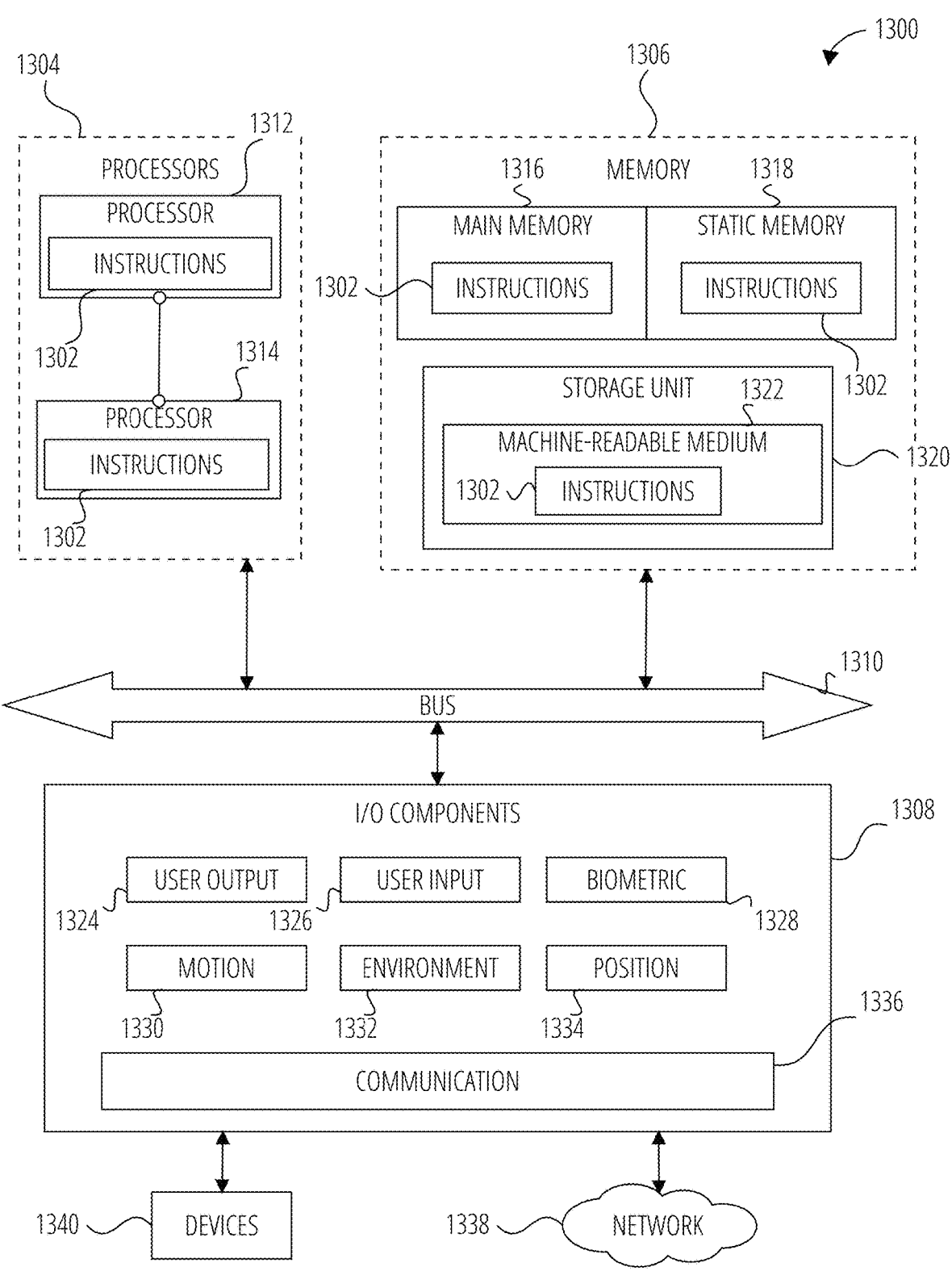
FIG. 13 is a diagrammatic representation of a machine in the form of a computer system within which a set of instructions may be executed to cause the machine to perform any one or more of the methodologies discussed herein, according to some examples.
Figure 14:
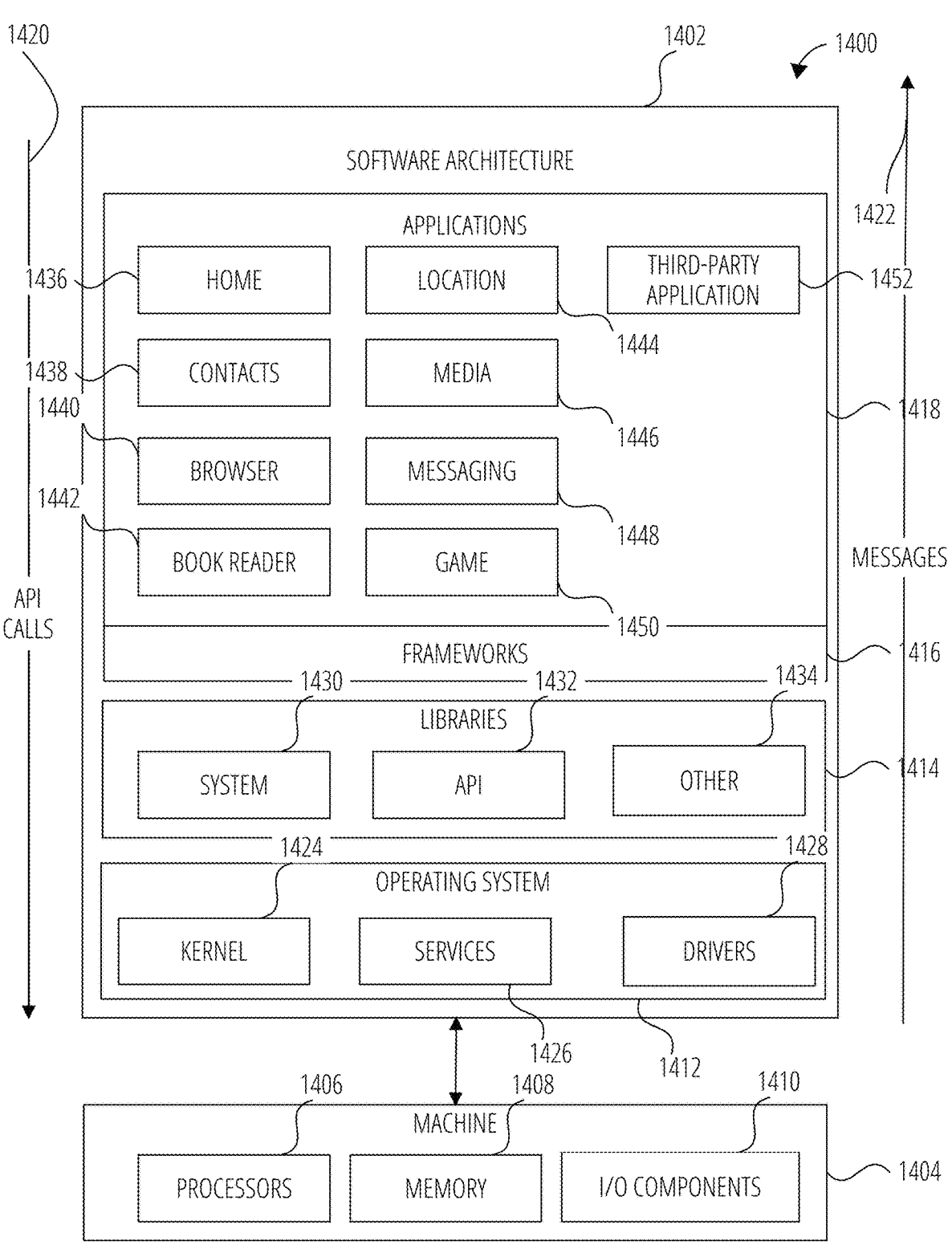
FIG. 14 is a block diagram showing a software architecture within which examples may be implemented.

FIG. 7 illustrates a method 700 of uploading a video, according to some examples. The method is shown below the method 600 of FIG. 6, to allow a comparison to be made. The transcoding, zipping, encrypting and uploading illustrated in FIG. 7 are performed by one or more components operating on non-transitory machine readable instructions as is known in the art. FIG. 13 illustrates a machine 1300 and FIG. 14 illustrates a software architecture on which the methods described herein may be performed.

In method 700, the video is broken into three chunks and the method proceeds in parallel as far as possible, with the zipping of chunk 1 commencing as soon as the transcoding of chunk 1 completes. The transcoding of chunk 2 begins as soon as the transcoding of chunk 1 completes.

The encrypting of chunk 1 then commences as soon as the zipping of chunk 1 completes, with the uploading of chunk 1 commencing as soon as the encrypting of chunk 1 completes.

This process continues, with the transcoding of chunk 3 beginning as soon as the transcoding of chunk 2 completes. The encrypting of chunk 2 commences as soon as the zipping of chunk 2 completes, with the uploading of chunk 2 commencing as soon as the encrypting of chunk 2 completes, and so forth. When the uploading of chunk 3 completes, the fragmented MP4 file 402 including the three chunks is assembled at the server, from where it can be transmitted to a recipient device. In some examples, the chunks can be transmitted to a recipient device for assembly into the fragmented MP4 file 402, but the additional step of transmitting the chunks to the recipient device from an upload server introduces additional uncertainty as regards network connectivity and file integrity issues.

Operations relating to file persistence 710 occur for each of transcoding, zipping and encrypting after the last chunk has received the corresponding processing step, because there might be dependencies between the generated chunks.

As illustrated in FIG. 7, method 700 for uploading a video file provides substantial time savings compared to the method 600.

Zipping is performed using a conventional utility such as GZIP. In some examples, the zipping function may be omitted completely, since the benefit of zipping traditionally relates more to the bundling of multiple files into one file, rather than compression as such. In such a case, each chunk is encrypted after transcoding, and then uploaded. In some examples, the zipping function is replaced with a compression-only function that is applied to each transcoded chunk before encrypting.

Figure 8:
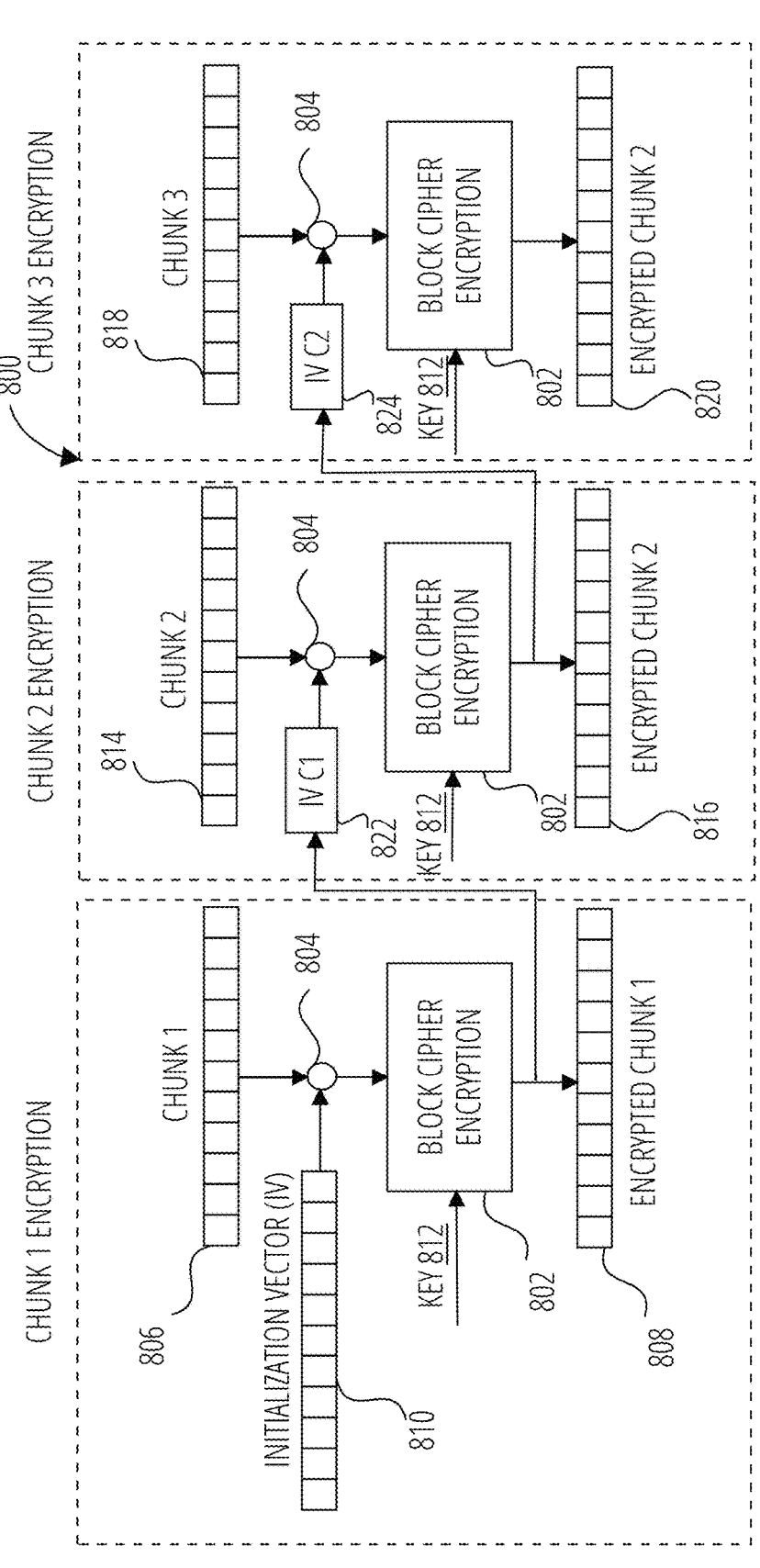
FIG. 8 is a flow diagram illustrating a method of encryption as applied to three chunks, according to some examples.

FIG. 8 is a flow diagram illustrating a method 800 of encryption as applied to three chunks, according to some examples. The method 800 utilizes a modification of well-known and conventional encryption methods such as AES (Advanced Encryption Standard) with CBC (Cipher Block Chaining) as the cipher mode and Public Key Cryptography Standards PKCS #7 padding as the padding scheme. In the method 800 each block of plaintext (i.e., a chunk in this case) is XORed (i.e., an exclusive OR operation is performed) with a portion of the previous ciphertext (i.e., the previous encrypted chunk) before being encrypted to generate the new ciphertext (i.e., the new encrypted chunk).

This way, each ciphertext depends on all of the plaintext blocks processed up to that point, and a block of cyphertext contains the text on which the next block of cyphertext depends for decryption purposes, making the dependence self-contained within the group of blocks, with the exception of the first block.

To make each ciphertext unique, an initialization vector is used in the first encryption block. A padding scheme is required for CBC because the encryption works on units of a fixed size (128-bit block sizes in AES), but data for encryption can come in a variety of lengths. If the plaintext's length is already a multiple of 128 bits, the ciphertext length=plaintext length+128. The final plaintext block will need to be padded before encryption if it is not a multiple of 128 bits.

Referring now to FIG. 8, the encryption of chunk 1 806 begins with an XOR operation 804 being performed between chunk 1 806 and initialization vector 810. Since this is the first chunk, initialization vector 810 is a random string. The result of the XOR operation 804 is then passed to block cipher encryption 802 where it is encrypted using encryption key 812. The last 128 bits of the resulting cyphertext is discarded to form encrypted chunk 1 808, which can now be uploaded.

The method 800 then proceeds with the encryption of chunk 2 814 with an XOR operation 804 being performed between chunk 2 814 and initialization vector C1 822, which is the last 128 bits of encrypted chunk 1 808. The result of the XOR operation 804 is then passed to block cipher encryption 802 where it is encrypted using encryption key 812. The last 128 bits of the resulting cyphertext is discarded to form encrypted chunk 2 816, which can now be uploaded.

An XOR operation 804 is then performed between chunk 3 818 and initialization vector C2 824, which is the last 128 bits of encrypted chunk 2 816. The result of the XOR operation 804 is then passed to block cipher encryption 802 where it is encrypted using encryption key 812. The last 128 bits of the resulting cyphertext is discarded to form encrypted chunk 3 820, which can now be uploaded.

As will be appreciated, the number of chunks being encrypted in this manner can be any number greater than two.

Figure 9A:
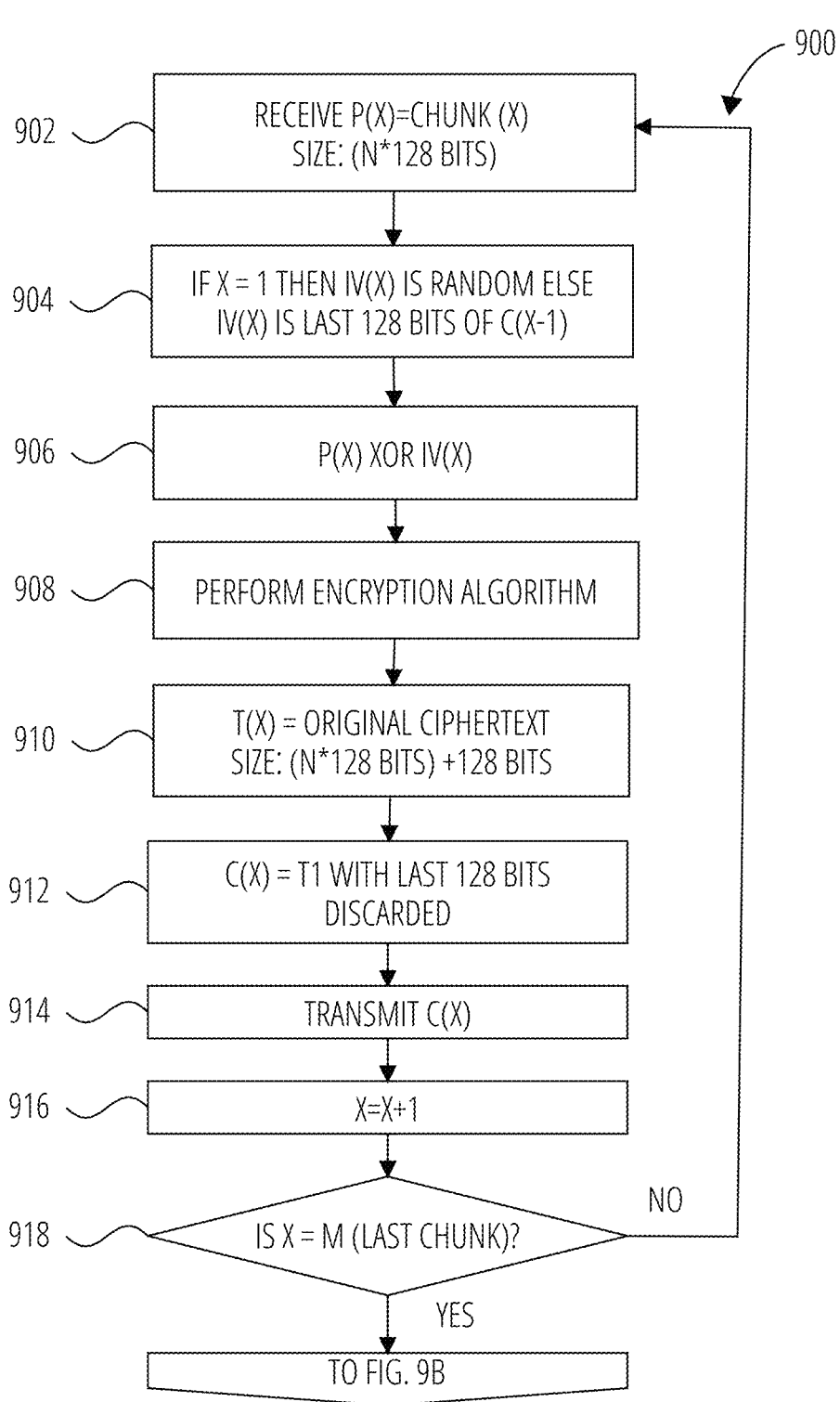
FIG. 9A and FIG. 9B illustrate a flowchart for performing chunked encryption of M number of chunks, according to some examples.
Figure 9B:
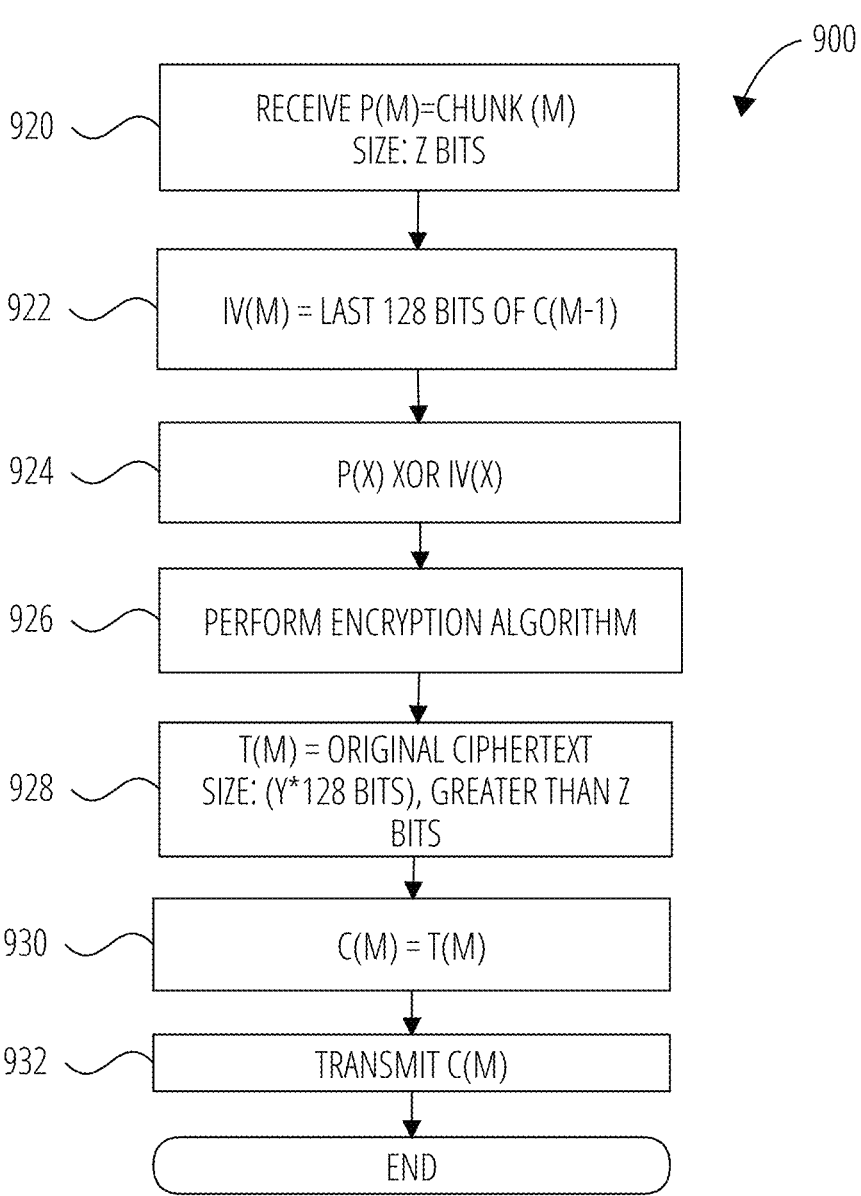

FIG. 9A and FIG. 9B illustrate a flowchart 900 for performing chunked encryption of M number of chunks, according to some examples. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The flowchart 900 begins with x=1 and thus operation 902 comprises the receipt of receiving plaintext p(1)=chunk (1), the size of the chunk is an integer multiple (N) of 128 bits.

In operation 904, if X=1 then initialization vector IV(1) is random. If X>1 then initialization vector IV(X) is the last 128 bits of C(X-1) as determined in operation 912. Chunk (X) and initialization vector IV(x) are XOR'd in operation 906 and the encryption algorithm is performed on the result in operation 908, with a known encryption method using an encryption key as described in FIG. 8.

Original ciphertext T(X) is then output by the encryption algorithm in operation 910. The size of the Original ciphertext T(X) is (N*128 bits)+128 bits. The last 128 bits of the original ciphertext T(X) is then discarded at operation 912 to form encrypted chunk C(X). Encrypted chunk C(X) is then uploaded in operation 914. X is then incremented by one in operation 916, and the value of X (the current chunk number) is checked in operation 918 against the value of M (the number of the last chunk. If X is now not equal to M (the number of the last chunk), the flowchart 900 returns to operation 902 and proceeds from there with the incremented value of X. If X is now equal to M (i.e., the last chunk), the flowchart 900 proceeds to operation 920 with receipt of the final plaintext(M), being chunk(M). Chunk M is of arbitrary size, but less than or equal to N*128 bits since it is the last chunk.

In operation 922, the initialization vector IV(M) is the last 128 bits of C(M−1) as determined in operation 912. Chunk (M) and initialization vector IV(M) are XOR'd in operation 924 and the encryption algorithm is performed on the result in operation 926, with a known encryption method using an encryption key as describe in FIG. 8.

Original ciphertext T(M) is then output by the encryption algorithm in operation 928. The size of the original cipher-text T(M) is (Y*128 bits), where Y is the next integer greater than Z/128 or it is Z if Z is an integer. If Z is not an integer, additional bits are provided to pad ciphertext T(M) to a size of (Y*128 bits) and a flag is set to indicate that only bits 1 to Z are valid. Encrypted chunk C(M) is then set equal to original ciphertext T(M) in operation 930 and the last encrypted chunk C(M) is transmitted in operation 932, at which point flowchart 900 ends.

Chunk uploading is performed by a resumable or multi-part upload service or API such as Google Cloud Services' Resumable Upload or the Multipart Upload service or API provided by Amazon Web Services. These services will maintain a single upload session or coordinate multiple upload sessions, and assemble the transmitted chunks into a fragmented MP4 file 402 for storage or for transmission to a recipient device.

The encrypted chunks are then assembled into the frag-mented MP4 file 402 after upload, and are transmitted to the recipient device for decryption and viewing. Decryption of each chunk is performed using the key 812 and either the initialization vector 810 (for the first chunk) or the last 128 bits of the previous encrypted chunk for subsequent chunks. Another benefit of the methods described herein is that the recipient device is able to decode both a video file that has been generated by the known method described above with reference to FIG. 6, as well as one generated by the methods described herein, without requiring an update to the decryp-tion algorithm at the receiver side.

Figure 10:
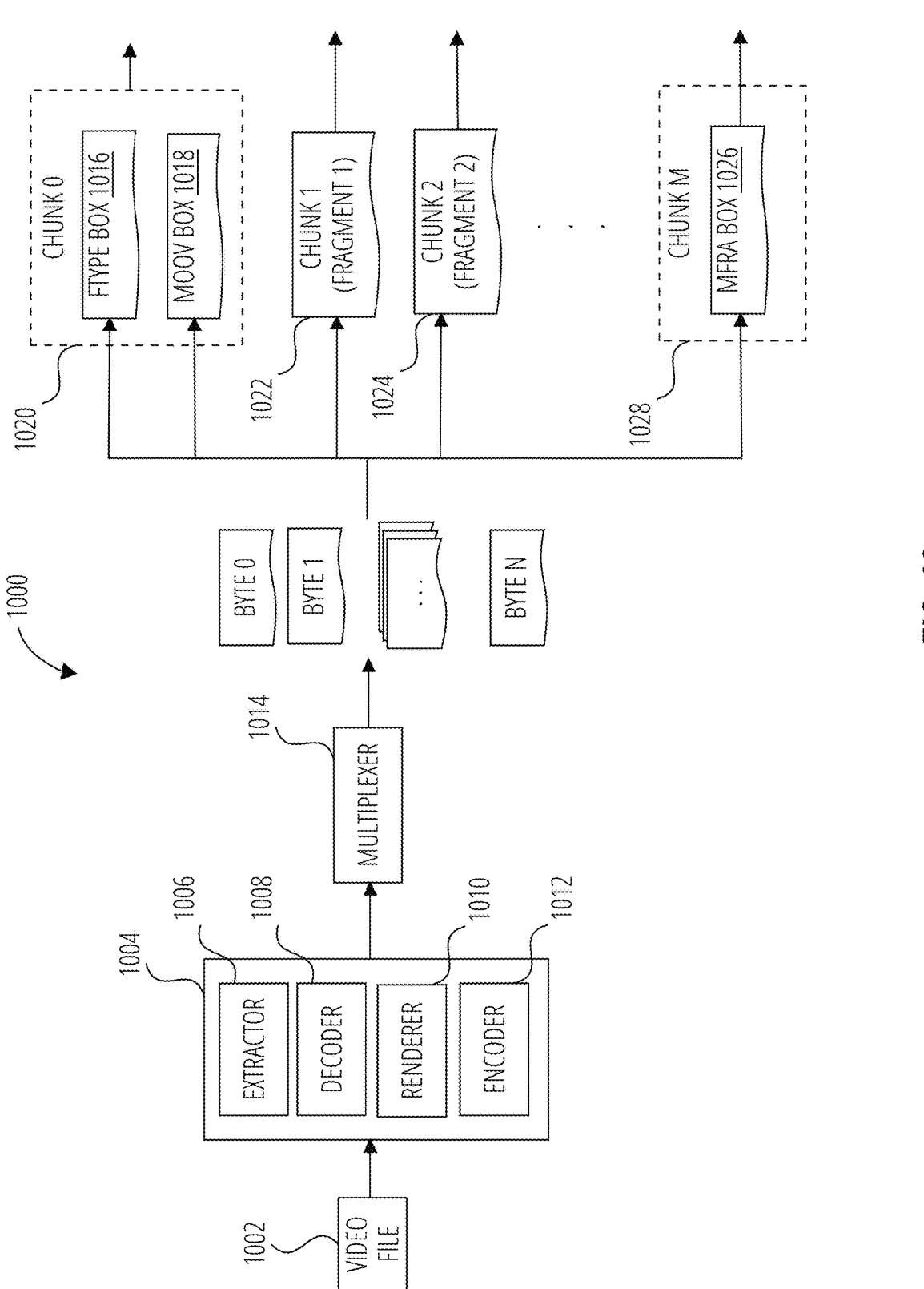
FIG. 10 illustrates a transcoding process for video files, according to some examples.

FIG. 10 illustrates a transcoding process 1000, according to some examples. A video file 1002 that has been selected for user transmission or upload is received by video pro-cessing component 1004, which is part of the image pro-cessing system 202. The video processing component 1004 comprises an extractor 1006 for extracting the video data from the video file 1002, a decoder 1008 for decoding the extracted video data, a renderer 1010 for rendering the extracted video data, and an encoder 1012 for encoding the rendered video data.

In the context of an interaction system 100, the user may provide input specifying augmented reality and other effects to apply to the video file 1002, either during video capture or after, to generate interesting visual and/or audio effects when viewing the video file 1002. To maintain flexibility, the video file 1002 is stored in some examples as an unedited or unmodified video file, while the identity of any augmented reality effect selected by the user, and associated parameters to allow a modified video to be recreated, are stored in an associated metadata file. Accordingly, in order to generate a data stream that represents the video file 1002 as modified by any selected effects or edits, the video processing component 1004 extracts, decodes, renders (applying any augmented reality or other effects or edits) and encodes the media file (with any augmented reality or other effects or edits applied) and passes a corresponding data stream to the multiplexer 1014.

The multiplexer 1014 in turn parses the data stream comprising bytes 0 to N, into fragments 0 to M, which are passed as soon as they are ready for further processing as described with reference to FIG. 7.

Various implementations are possible. In the implemen-tation illustrated in FIG. 10, Chunk 0 1020 comprises ftype box 1016 and moov box 1018, while chunk 1 1022 com-prises the first fragment 404 of a fragmented MP4 file 402, chunk 2 1024 comprises the second fragment 404 of the fragmented MP4 file 402 and so forth. The final chunk, chunk M 1028, comprises the mfra box 1026. Accordingly, this implementation mirrors the structure of the fragmented MP4 file 402, with chunk 0 1020 and chunk M 1028 not containing any media data 502 and thus being smaller than the other, media-containing, chunks 0 to M−1. This provides a slightly simpler assembly of the chunks into the frag-mented MP4 file 402 after upload.

However, in some examples, chunks of equal size are provided, in which case chunk 0 1020 would also contain media data 502, corresponding to all or part of a fragment 404. In such a case, the uploading service, such as Google Cloud Services' Resumable Upload service, assembles the fragmented MP4 file 402 based on header data in each of the chunks.

The size of the individual chunks and individual frag-ments vary, in other examples. The size of the individual chunks and fragments may be based on the duration of a video segment (3 seconds for example), in which case the size of the chunk or fragment will vary based on the complexity of the video segment. Providing chunks and fragments of a fixed size does have the advantage of simpler implementation, but the benefits of the chunked transmis-sion methods disclosed herein are still present regardless of whether fixed or variable chunk and fragment sizes are used.

Figure 11:
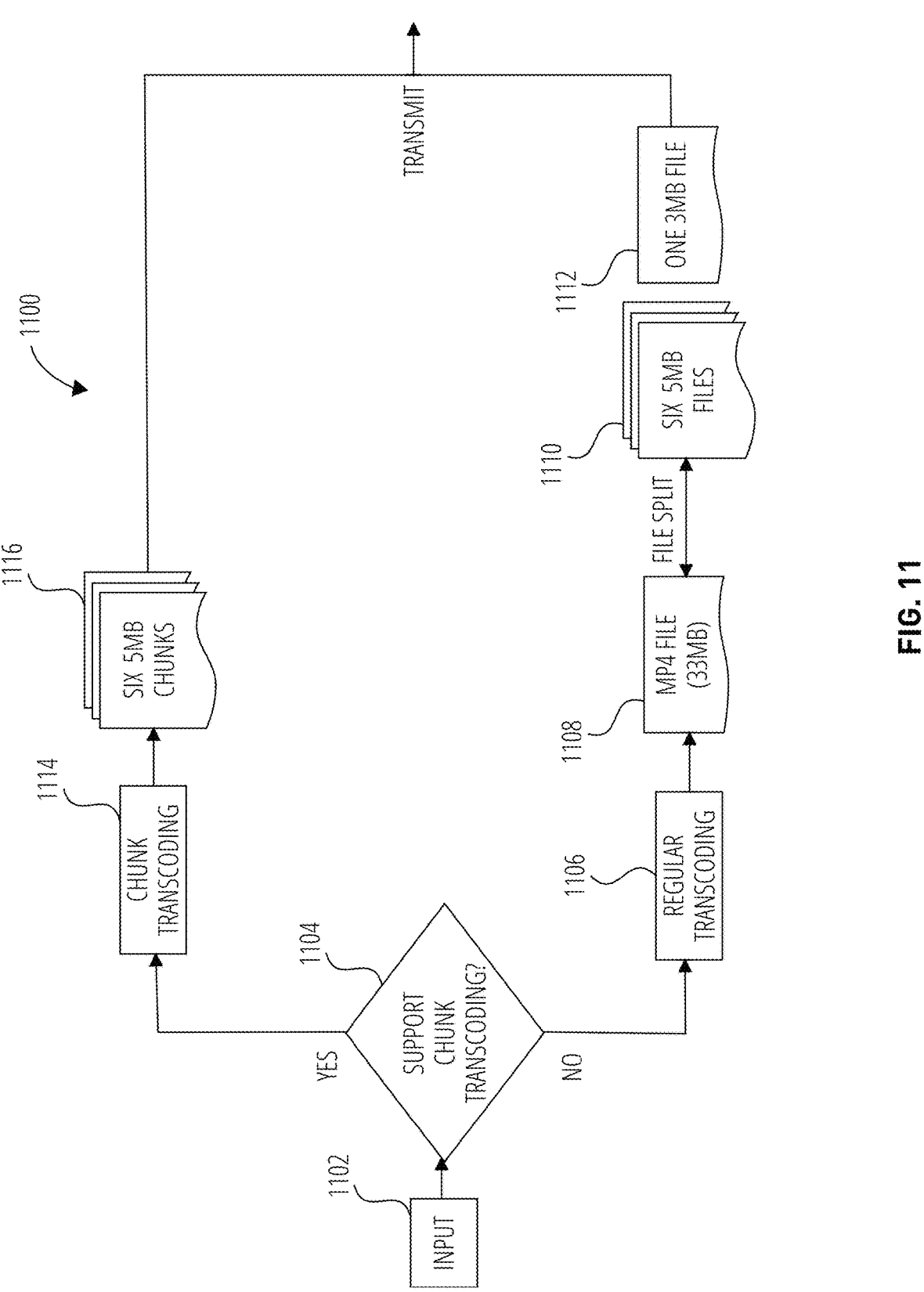
FIG. 11 is a flowchart 1100 illustrating a method of ensuring compatibility with the chunked transcoding methods disclosed herein, according to some examples.

FIG. 11 is a flowchart 1100 illustrating a method of ensuring compatibility with the chunked transcoding meth-ods disclosed herein, according to some examples. In this implementation, fixed chunk sizes of 3 MB are used.

In operation 1102, user input to transmit a video file is received. In operation 1104 the interaction client 104 deter-mines if relevant components of the interaction system 100 all support the use of chunked transcoding and fMP4. For example, if the interaction client 104 or the user system 102 does not support the chunked transcoding method (such as if the multiplexer 1014 is disabled or not installed), if the recipient's interaction client 104 or user system 102 does not support fMP4, then the method proceeds to regular transcod-ing 1106 to generate a regular MP4 file (33 MB) 1108.

The MP4 file (33 MB) 1108 is then split into six files 1110 of 5 MB each and one 3 MB file 1112, all of which are then uploaded to a server (such as a database server 126) using known parallel upload techniques, where it is reassembled into the regular MP4 file. The regular MP4 file can then be stored or forwarded to the recipient's user system 102. In some examples the six files 1110 and the one 3 MB file 1112 are encrypted as in described above in FIG. 8, FIG. 9A and then zipped before transmission.

If the interaction client 104 and any other required com-ponents are compatible as determined in operation 1104, the method proceeds to operation 1114, where chunk transcod-ing is performed as described above with reference to FIG. 7 to FIG. 10, resulting in a total of six 5 MB chunks 1116, which are prepared and transmitted in parallel as discussed above.

Figure 12:
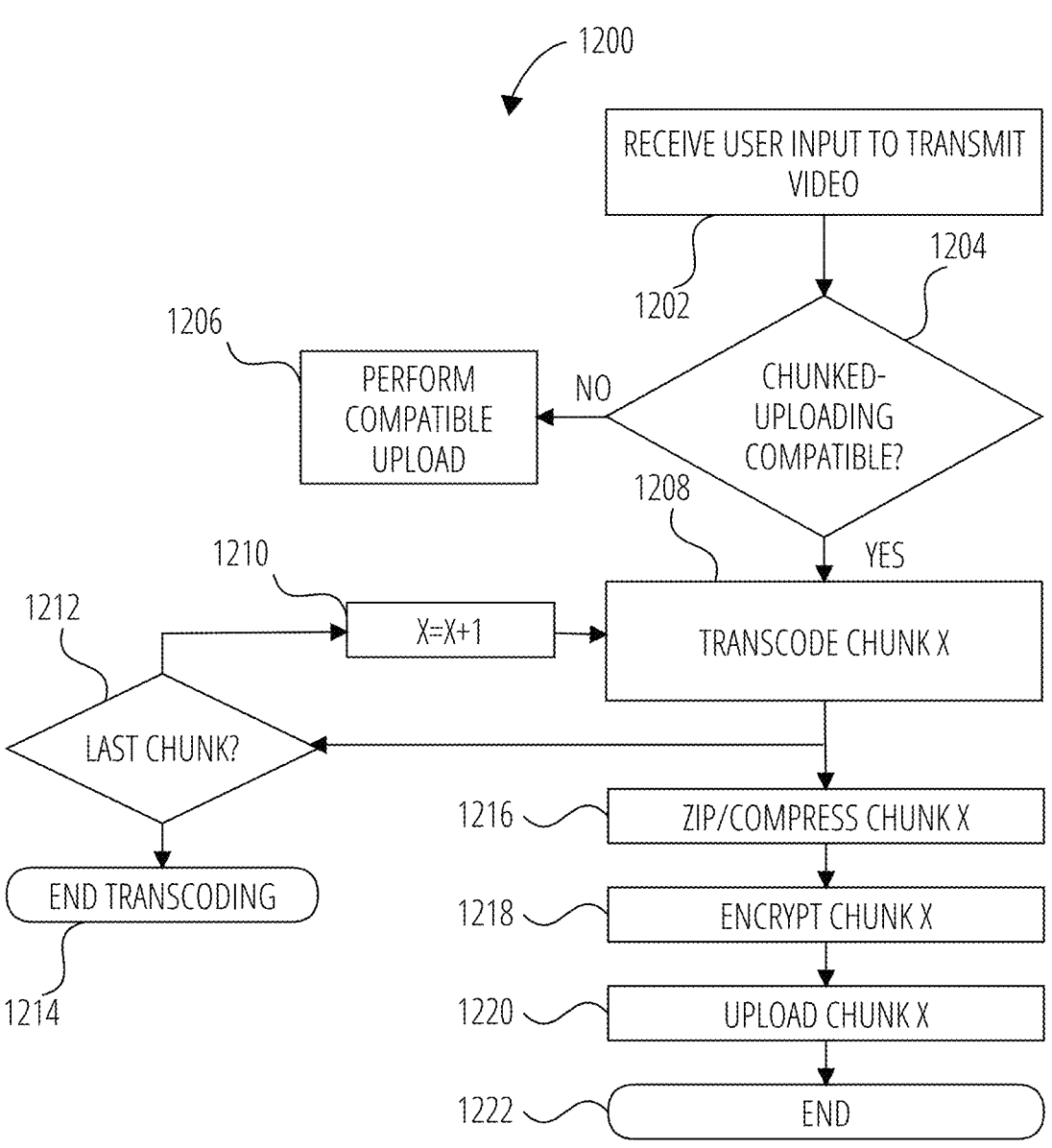
FIG. 12 is a flowchart 1200 illustrating a method 700 of uploading a video, according to some examples.

FIG. 12 is a flowchart 1200 illustrating a method of uploading a video file, according to some examples. As will be appreciated, the operations of the flowchart 1200 do not occur serially or linearly. Each of operations 1208, 1216, 1218 and 1220 occur in parallel until that operation is complete, at which point it passes its output to the next operation. If new input for that operation is available, it processes the new input. If not, the operation waits for receipt of further input. In some examples the flowchart 1200 is be performed by the mobile device 114, the head-wearable apparatus 116, or the computer client device 118 ("the device.")

The method starts at operation 1202 with receipt by the device of user input to transmit a video file 1002. In operation 1204 it is determined whether or not all of the required components support chunk-compatible uploading. If not, a compatible upload is performed in operation 1206, for example using a regular MP4 file 302 as described with reference to FIG. 10. If all of the required components support chunk-compatible uploading, the flowchart 1200 proceeds to operation 1208 with X=0.

The device then proceeds to operation 1208 and begins transcoding chunk 0, comprising a first portion of the video file 1002. When the transcoding of chunk 0 is complete, transcoded chunk 0 is passed to operation 1216. The end of the transcoding of chunk 0 is determined by parameters stored by video processing component 1004, such as the chunk reaching a certain size, containing certain information, or based on a particular, specified length of the video fragment. The device then determines in operation 1212 whether or not the last chunk has been received.

If it is determined in operation 1212 that the last chunk has not been processed, the value of X is incremented in operation 1210 and transcoding of the next chunk commences in operation 1208. If the last chunk has been transcoded, transcoding ends in operation 1214, but the remaining flowchart operations continue until they are each complete. The last chunk includes metadata identifying it as the last chunk, including for example a pointer to indicate the end of valid data in the chunk.

A transcoded chunk received from operation 1208 is zipped or compressed at operation 1216 and then the zipped/compressed chunk is passed to operation 1218. Operation 1216 then waits for the next transcoded chunk from operation 1208, or begins zipping or compressing it immediately if available.

A compressed/zipped chunk received from operation 1216 is encrypted at operation 1218 using a known encryption method as described above with reference to FIG. 8, FIG. 9A and FIG. 9B, and the encrypted chunk is passed to operation 1220. Operation 1218 then waits for the next zipped/compressed chunk from operation 1216, or begins encrypting it immediately if available.

An encrypted chunk received from operation 1218 is uploaded at operation 1220 as described above. Operation 1220 then waits for the next encrypted chunk from operation 1218, or begins uploading it immediately if available. When the last chunk has been uploaded in operation 1220, the flowchart 1200 ends at operation 1222.

The uploaded chunks are assembled into a single file in the interaction server system 110. This single file is received, decrypted, unzipped or decompressed as a regular fragmented mp4 file by a recipient device such as a mobile device 114, a head-wearable apparatus 116, or a computer client device 118 in possession of the intended recipient(s) of the video file 1002. The operations performed by the interaction server system 110 may utilize third-party servers

112 or third party services such as Google Cloud or Amazon Web Services to perform these steps instead of performing them directly.

Machine Architecture

FIG. 13 is a diagrammatic representation of the machine 1300 within which instructions 1302 (e.g., software, a program, an application, an applet, an app, or other executable code) for causing the machine 1300 to perform any one or more of the methodologies discussed herein may be executed. For example, the instructions 1302 may cause the machine 1300 to execute any one or more of the methods described herein. The instructions 1302 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1302, sequentially or otherwise, that specify actions to be taken by the machine 1300. Further, while a single machine 1300 is illustrated, the term "machine" shall also be taken to include a collection of machines that individually or jointly execute the instructions 1302 to perform any one or more of the methodologies discussed herein. The machine 1300, for example, may comprise the user system 102 or any one of multiple server devices forming part of the interaction server system 110. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1308, which may be configured to communicate with each other via a bus 1310. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1312 and a processor 1314 that execute the instructions 1302. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1316, a static memory 1318, and a storage unit 1320, both accessible to the processors 1304 via the bus 1310. The main memory 1306, the static memory 1318, and storage unit 1320 store the instructions 1302 embodying any one or more of the methodologies or functions described herein. The instructions 1302 may also reside, completely or partially, within the main memory 1316, within the static memory 1318, within machine-readable medium 1322 within the storage unit 1320, within at least one of the processors 1304 (e.g., within the processor's cache memory), or any suitable combination thereof, during execution thereof by the machine 1300.

The I/O components 1308 may include a wide variety of components to receive input, provide output, produce output, transmit information, exchange information, capture measurements, and so on. The specific I/O components 1308 that are included in a particular machine will depend on the type of machine. For example, portable machines such as mobile phones may include a touch input device or other such input mechanisms, while a headless server machine will likely not include such a touch input device. It will be appreciated that the I/O components 1308 may include many other components that are not shown in FIG. 13. In various examples, the I/O components 1308 may include user output components 1324 and user input components 1326. The user output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1308 may include biometric components 1328, motion components 1330, environmental components 1332, or position components 1334, among a wide array of other components. For example, the biometric components 1328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1330 include acceleration sensor components (e.g., accelerometer), gravitation sensor components, rotation sensor components (e.g., gyroscope).

The environmental components 1332 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 3600 camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1334 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1308 further include communication components 1336 operable to couple the machine 1300 to a network 1338 or devices 1340 via respective coupling or connections. For example, the communication components 1336 may include a network interface component or another suitable device to interface with the network 1338. In further examples, the communication components 1336 may include wired communication components, wireless communication components, cellular communication components, Near Field Communication (NFC) components, Bluetooth© components (e.g., Bluetooth© Low Energy), Wi-Fi© components, and other communication components to provide communication via other modalities. The devices 1340 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, location via detecting an NFC beacon signal that may indicate a particular location, and so forth.

The various memories (e.g., main memory 1316, static memory 1318, and memory of the processors 1304) and storage unit 1320 may store one or more sets of instructions and data structures (e.g., software) embodying or used by any one or more of the methodologies or functions described herein. These instructions (e.g., the instructions 1302), when executed by processors 1304, cause various operations to implement the disclosed examples.

The instructions 1302 may be transmitted or received over the network 1338, using a transmission medium, via a network interface device (e.g., a network interface component included in the communication components 1336) and using any one of several well-known transfer protocols (e.g., hypertext transfer protocol (HTTP)). Similarly, the instructions 1302 may be transmitted or received using a transmission medium via a coupling (e.g., a peer-to-peer coupling) to the devices 1340.

Software Architecture

FIG. 14 is a block diagram 1400 illustrating a software architecture 1402, which can be installed on any one or more of the devices described herein. The software architecture 1402 is supported by hardware such as a machine 1404 that includes processors 1406, memory 1408, and I/O components 1410. In this example, the software architecture 1402 can be conceptualized as a stack of layers, where each layer provides a particular functionality. The software architecture 1402 includes layers such as an operating system 1412, libraries 1414, frameworks 1416, and applications 1418. Operationally, the applications 1418 invoke API calls 1420 through the software stack and receive messages 1422 in response to the API calls 1420.

The operating system 1412 manages hardware resources and provides common services. The operating system 1412 includes, for example, a kernel 1424, services 1426, and drivers 1428. The kernel 1424 acts as an abstraction layer between the hardware and the other software layers. For example, the kernel 1424 provides memory management, processor management (e.g., scheduling), component management, networking, and security settings, among other functionalities. The services 1426 can provide other common services for the other software layers. The drivers 1428 are responsible for controlling or interfacing with the underlying hardware. For instance, the drivers 1428 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1414 provide a common low-level infrastructure used by the applications 1418. The libraries 1414 can include system libraries 1430 (e.g., C standard library) that provide functions such as memory allocation functions, string manipulation functions, mathematic functions, and the like. In addition, the libraries 1414 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1414 can also include a wide variety of other libraries 1434 to provide many other APIs to the applications 1418.

The frameworks 1416 provide a common high-level infrastructure that is used by the applications 1418. For example, the frameworks 1416 provide various graphical user interface (GUI) functions, high-level resource management, and high-level location services. The frameworks 1416 can provide a broad spectrum of other APIs that can be used by the applications 1418, some of which may be specific to a particular operating system or platform.

In an example, the applications 1418 may include a home application 1436, a contacts application 1438, a browser application 1440, a book reader application 1442, a location application 1444, a media application 1446, a messaging application 1448, a game application 1450, and a broad assortment of other applications such as a third-party application 1452. The applications 1418 are programs that execute functions defined in the programs. Various programming languages can be employed to create one or more of the applications 1418, structured in a variety of manners, such as object-oriented programming languages (e.g., Objective-C, Java, or C++) or procedural programming languages (e.g., C or assembly language). In a specific example, the third-party application 1452 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1452 can invoke the API calls 1420 provided by the operating system 1412 to facilitate functionalities described herein.

EXAMPLES

Various examples are contemplated. Example 1 is a system comprising: at least one processor; at least one memory component storing instructions that, when executed by the at least one processor, cause the at least one processor to perform operations comprising: receiving user input to transmit a video file; transcoding a first portion of the video file to generate a transcoded first portion of the video file; processing the transcoded first portion of the video file to generate a processed first portion of the video file; while the processed first portion of the video file is being generated, transcoding a second portion of the video file to generate a transcoded second portion of the video file; and uploading the processed first portion of the video file upon completion of its generation.

In Example 2, the subject matter of Example 1 includes, wherein the operations further comprise: processing the transcoded second portion of the video file to generate a processed second portion of the video file; uploading the processed second portion of the video file upon completion of its generation; and assembling the processed first portion of the video file and the processed second portion of the video file into a fragmented file format.

In Example 3, the subject matter of Example 2 includes, wherein the operations further comprise: transmitting the video file in the fragmented file format to a recipient device for viewing.

In Example 4, the subject matter of Examples 2-3 includes, wherein the operations further comprise: transmitting the processed first portion of the video file and the processed second portion of the video file to a recipient device before assembling the processed first portion of the video file and the processed second portion of the video file into a fragmented file format.

In Example 5, the subject matter of Examples 1-4 includes, wherein the processing of the transcoded first portion of the video file comprises zipping or compressing of the transcoded first portion of the video file to generate the processed first portion of the video file.

In Example 6, the subject matter of Example 5 includes, wherein the processing of the transcoded first portion of the video file comprises encrypting the transcoded first portion of the video file to generate the processed first portion of the video file.

In Example 7, the subject matter of Examples 1-6 includes, wherein processing of the transcoded first portion of the video file comprises encrypting of the transcoded first portion of the video file to generate the processed first portion of the video file.

In Example 8, the subject matter of Example 7 includes, wherein the operations further comprise: processing the transcoded second portion of the video file to generate a processed second portion of the video file, wherein the processing of the transcoded second portion of the video file comprises encrypting the transcoded second portion of the video file using an extract from the processed first portion of the video file.

In Example 9, the subject matter of Examples 1-8 includes, wherein the transcoding of the first portion of the video file comprises applying visual effects to the first portion of the video file to generate the transcoded first portion of the video file.

In Example 10, the subject matter of Example 9 includes, wherein the visual effects comprise augmented reality effects specified by user input received on a mobile device.

In Example 11, the subject matter of Examples 2-10 includes, wherein the operations further comprise: transcoding one or more further portions of the video file to generate one or more processed further portions of the video file; uploading the one or more processed further portions of the video file; and assembling the processed first portion of the video file, the processed second portion of the video file, and the one or more processed further portions of the video file into a fragmented file format.

Example 12 is a non-transitory computer-readable storage medium storing instructions that, when executed by at least one processor, cause the at least one processor to perform operations comprising: receiving user input to transmit a video file; transcoding a first portion of the video file to generate a transcoded first portion of the video file; processing the transcoded first portion of the video file to generate a processed first portion of the video file; while the processed first portion of the video file is being generated, transcoding a second portion of the video file to generate a transcoded second portion of the video file; and uploading the processed first portion of the video file upon completion of its generation.

In Example 13, the subject matter of Example 12 includes, wherein the operations further comprise: processing the transcoded second portion of the video file to generate a processed second portion of the video file; uploading the processed second portion of the video file upon completion of its generation; and assembling the processed first portion of the video file and the processed second portion of the video file into a fragmented file format.

In Example 14, the subject matter of Example 13 includes, wherein the operations further comprise: transcoding one or more further portions of the video file to generate one or more processed further portions of the video file; uploading the one or more processed further portions of the video file; and assembling the processed first portion of the video file, the processed second portion of the video file, and the one or more processed further portions of the video file into a fragmented file format.

In Example 15, the subject matter of Examples 12-14 includes, wherein the transcoding of the first portion of the video file comprises applying visual effects to the first portion of the video file to generate the transcoded first portion of the video file.

In Example 16, the subject matter of Examples 12-15 includes, wherein processing of the transcoded first portion of the video file comprises encrypting of the transcoded first portion of the video file to generate the processed first portion of the video file.

In Example 17, the subject matter of Example 16 includes, wherein the operations further comprise: processing the transcoded second portion of the video file to generate a processed second portion of the video file, wherein the processing of the transcoded second portion of the video file comprises encrypting the transcoded second portion of the video file using an extract from the processed first portion of the video file.

Example 18 is a method, performed by at least one processor, the method comprising: receiving user input to transmit a video file; transcoding a first portion of the video file to generate a transcoded first portion of the video file; processing the transcoded first portion of the video file to generate a processed first portion of the video file; while the processed first portion of the video file is being generated, transcoding a second portion of the video file to generate a transcoded second portion of the video file; and uploading the processed first portion of the video file upon completion of its generation.

In Example 19, the subject matter of Example 18 includes, processing the transcoded second portion of the video file to generate a processed second portion of the video file; uploading the processed second portion of the video file upon completion of its generation; and assembling the processed first portion of the video file and the processed second portion of the video file into a fragmented file format.

In Example 20, the subject matter of Examples 18-19 includes, wherein the transcoding of the first portion of the video file comprises applying visual effects to the first portion of the video file to generate the transcoded first portion of the video file.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20. Example 23 is a system to implement of any of Examples 1-20. Example 24 is a method to implement of any of Examples 1-20.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multiprocessor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system comprising:
   at least one processor; and
   at least one memory component storing instructions that, when executed by the at least one processor, cause the at least one processor to:
   receive user input to transmit a video file;
   transcode a first portion of the video file to generate a transcoded first portion of the video file;
   process the transcoded first portion of the video file to generate a processed first portion of the video file, the processing of the transcoded first portion of the video file to generate the processed first portion comprising encrypting the transcoded first portion of the video file;
   while the processed first portion of the video file is being generated, transcode a second portion of the video file to generate a transcoded second portion of the video file;
   process the transcoded second portion of the video file to generate a processed second portion of the video file, the processing of the transcoded second portion of the video file comprising encrypting the transcoded second portion of the video file using an extract from the processed first portion of the video file; and
   upload the processed first portion of the video file upon completion of its generation.

2. The system of claim 1, wherein the instructions further cause the at least one processor to:
   process the transcoded second portion of the video file to generate a processed second portion of the video file;
   upload the processed second portion of the video file upon completion of its generation; and
   assemble the processed first portion of the video file and the processed second portion of the video file into a fragmented file format.

3. The system of claim 2, wherein the instructions further cause the at least one processor to:

transmit the video file in the fragmented file format to a recipient device for viewing.

4. The system of claim 2, wherein the instructions further cause the at least one processor to:

transmit the processed first portion of the video file and the processed second portion of the video file to a recipient device before assembling the processed first portion of the video file and the processed second portion of the video file into the fragmented file format.

5. The system of claim 2, wherein the instructions further cause the at least one processor to:

transcode one or more further portions of the video file to generate one or more processed further portions of the video file;

upload the one or more processed further portions of the video file; and assemble the processed first portion of the video file, the processed second portion of the video file, and the one or more processed further portions of the video file into the fragmented file format.

6. The system of claim 1, wherein the processing of the transcoded first portion of the video file comprises zipping or compressing of the transcoded first portion of the video file to generate the processed first portion of the video file.

7. The system of claim 1, wherein the transcoding of the first portion of the video file comprises applying visual effects to the first portion of the video file to generate the transcoded first portion of the video file.

8. The system of claim 7, wherein the visual effects comprise augmented reality effects specified by user input received on a mobile device.

9. A non-transitory computer-readable storage medium storing instructions that, when executed by at least one processor, cause the at least one processor to perform operations comprising:

receiving user input to transmit a video file;

transcoding a first portion of the video file to generate a transcoded first portion of the video file;

processing the transcoded first portion of the video file to generate a processed first portion of the video file, the processing of the transcoded first portion of the video file to generate the processed first portion comprising encrypting the transcoded first portion of the video file;

while the processed first portion of the video file is being generated, transcoding a second portion of the video file to generate a transcoded second portion of the video file;

processing the transcoded second portion of the video file to generate a processed second portion of the video file, the processing of the transcoded second portion of the video file comprising encrypting the transcoded second portion of the video file using an extract from the processed first portion of the video file; and uploading the processed first portion of the video file upon completion of its generation.

10. The non-transitory computer-readable storage medium of claim 9, wherein the operations further comprise:

processing the transcoded second portion of the video file to generate a processed second portion of the video file;

uploading the processed second portion of the video file upon completion of its generation; and assembling the processed first portion of the video file and the processed second portion of the video file into a fragmented file format.

11. The non-transitory computer-readable storage medium of claim 10, wherein the operations further comprise:

transcoding one or more further portions of the video file to generate one or more processed further portions of the video file;

uploading the one or more processed further portions of the video file; and assembling the processed first portion of the video file, the processed second portion of the video file, and the one or more processed further portions of the video file into the fragmented file format.

12. The non-transitory computer-readable storage medium of claim 9, wherein the transcoding of the first portion of the video file comprises applying visual effects to the first portion of the video file to generate the transcoded first portion of the video file.

13. The non-transitory computer-readable storage medium of claim 12, wherein the visual effects comprise augmented reality effects specified by user input received on a mobile device.

14. A method, performed by at least one processor, the method comprising:

receiving user input to transmit a video file;

transcoding a first portion of the video file to generate a transcoded first portion of the video file;

processing the transcoded first portion of the video file to generate a processed first portion of the video file, the processing of the transcoded first portion of the video file to generate the processed first portion comprising encrypting the transcoded first portion of the video file;

while the processed first portion of the video file is being generated, transcoding a second portion of the video file to generate a transcoded second portion of the video file;

processing the transcoded second portion of the video file to generate a processed second portion of the video file, the processing of the transcoded second portion of the video file comprising encrypting the transcoded second portion of the video file using an extract from the processed first portion of the video file; and uploading the processed first portion of the video file upon completion of its generation.

15. The method of claim 14, further comprising:

processing the transcoded second portion of the video file to generate a processed second portion of the video file;

uploading the processed second portion of the video file upon completion of its generation; and assembling the processed first portion of the video file and the processed second portion of the video file into a fragmented file format.

16. The method of claim 15, further comprising:

transcoding one or more further portions of the video file to generate one or more processed further portions of the video file;

uploading the one or more processed further portions of the video file; and assembling the processed first portion of the video file, the processed second portion of the video file, and the one or more processed further portions of the video file into the fragmented file format.

17. The method of claim 15, further comprising:

transmitting the processed first portion of the video file and the processed second portion of the video file to a recipient device before assembling the processed first portion of the video file and the processed second portion of the video file into the fragmented file format.

18. The method of claim 14, wherein the transcoding of the first portion of the video file comprises applying visual effects to the first portion of the video file to generate the transcoded first portion of the video file.

19. The method of claim 18, wherein the visual effects comprise augmented reality effects specified by user input received on a mobile device.

20. The method of claim 14, further comprising:

wherein the processing of the transcoded first portion of the video file comprises zipping or compressing of the transcoded first portion of the video file to generate the processed first portion of the video file.

* * * * *